United States Patent [19]
Lu et al.

[11] Patent Number: 4,801,403
[45] Date of Patent: Jan. 31, 1989

[54] AQUEOUS MINERAL DISPERSIONS

[75] Inventors: Cheng-Fa Lu, Newark; Lawrence L. Nelson, Wilmington, both of Del.

[73] Assignee: Hercules Incorporated, Wilmington, Del.

[21] Appl. No.: 74,731

[22] Filed: Jul. 17, 1987

[51] Int. Cl.[4] .............................................. C04B 20/06
[52] U.S. Cl. .......................... 252/378 R; 106/DIG. 3
[58] Field of Search .............. 252/378 R; 106/DIG. 3

[56] References Cited

U.S. PATENT DOCUMENTS

| 4,391,733 | 7/1983 | Lamar et al. | 252/378 R |
| 4,391,734 | 7/1983 | Ferreira et al. | 252/378 R |
| 4,539,046 | 9/1985 | McAloon et al. | 252/378 R |
| 4,608,303 | 8/1986 | Ballard et al. | 106/74 |
| 4,655,842 | 4/1987 | Ou et al. | 106/288 B |

*Primary Examiner*—William R. Dixon, Jr.
*Assistant Examiner*—Anthony J. Green
*Attorney, Agent, or Firm*—John P. Luther; Marion C. Staves

[57] ABSTRACT

A process for the production of an aqueous dispersion of vermiculite ore particles comprising delaminating vermiculite ore by subjecting an aqueous slurry of the ore to a shearing action until a dispersion containing vermiculite lamellae having dimensions less than 200 microns is produced.

16 Claims, No Drawings

AQUEOUS MINERAL DISPERSIONS

FIELD OF THE INVENTION

This invention relates to a process for the production of aqueous dispersions of delaminated vermiculite and solid articles manufactured therefrom.

BACKGROUND OF THE INVENTION

It is known that solid articles or products such as paper, films, coatings and non-sheet solids can be formed from aqueous dispersions of delaminated vermiculite ore, known as platelets or lamellae, by casting the dispersions against surfaces of various shapes and sizes and removing water from the vermiculite particles. Such dispersions can also be used to form rigid foams by gasifying the dispersion prior to removal of water from it.

Vermiculite platelets or lamellae can be characterized as tiny particles of vermiculite having a particle size typically less than 200 microns, preferably less than 50 microns, and having one dimension that is small compared to the other two dimensions. Such particles can be further characterized as having an aspect ratio (i.e., length or breadth divided by thickness) of at least 10, preferably at least 100 and more preferably at least 1,000, for example 10,000.

It is also known that vermiculite ore, a type of layer mineral (and other layer-silicate minerals containing vermiculite layers, e.g., hydrobiotite or chlorite vermiculite) can be delaminated to produce aqueous dispersions of vermiculite lamellae by first expanding or exfoliating the mineral by application of heat, or by chemical means followed by soaking or washing with water to swell the vermiculite particulate structure. The resulting expanded or swollen granules of vermiculite are then mechanically sheared to form an aqueous dispersion of vermiculite lamellae. Such processes typically involve heating the vermiculite mineral to temperatures of 1400° F. or more (thermal exfoliation of vermiculite) or by treatment with hydrogen peroxide or with aqueous solutions of inorganic and/or organic salts prior to swelling and shearing the vermiculite particles (chemical delamination of vermiculite). Accordingly, such processes for the delamination of vermiculite ore and the manufacture of products therefrom are described, for example, in U.S. Pat. Nos. 4,608,303; 4,472,478; 4,271,228; 3,791,969; 3,434,917; 3,325,340; and, GB Nos. 2,007,153; 1,585,104; 1,119,305; and 1,076,786.

Delamination processes such as discussed above, however, are nondesirable from the standpoint that they require expensive and time consuming steps. For example, thermal exfoliation of vermiculite followed by mechanical shearing necessitates maintaining costly high processing temperatures, typically above 1400° F., to expand the vermiculite ore. Chemical delamination of vermiculite also involves costly extra processing steps involving treatment of vermiculite ore with various chemical salt solutions. Such chemical treatment further involves more time consuming steps of washing out excess salts and swelling the vermiculite ore to at least twice its original volume prior to shearing to obtain lamellae of the desired size. Chemical delamination processes can also involve equipment corrosion problems due to the presence of high concentrations of chloride ions from salt solutions employed therein with attendant toxicity and effluent stream disposal concerns requiring extensive effluent waste stream processing.

Furthermore, delamination processes such as described above can increase labor and production costs in the manufacture of paper, paper products and rigid foam articles from vermiculite ore, as drainage and production rates are decreased due to voluminous vermiculite structures produced from ore expanding and swelling steps. Finely, some chemical delamination techniques which utilize organocations to intercalate vermiculite ore and permit swelling of the ore in water may introduce a high loading of organics into the vermiculite structure therein decreasing thermal and oxidative stabilities of paper, rigid foam and non-sheet solids manufactured from such delaminated ore.

It is an object, therefore, of this invention to provide an improved process for producing dispersions of vermiculite lamellae which eliminates such costly and time consuming steps associated with thermal and chemical exfoliation and delamination as set forth above, and to produce paper, films, coatings, rigid foams and non-sheet solid articles therefrom.

SUMMARY OF THE INVENTION

According to the instant invention, a novel and improved process for the production of solid articles from vermiculite is provided comprising (1) delaminating vermiculite ore by subjecting an aqueous slurry of the ore to a shearing action until a dispersion containing vermiculite lamellae having dimensions less than 200 microns is produced, then (2) forming shaped articles from the dispersion produced in step (1) by depositing vermiculite lamellae on a surface and removing water from the vermiculite particles. Further, a dispersant or combination of dispersants can be added to the aqueous slurry of vermiculite ore before, during or after shearing, said dispersant being capable of allowing for high solids content in the resultant dispersions of vermiculite lamellae by giving the slurry a viscosity less than the viscosity of the slurry before adding the dispersant.

DETAILED DESCRIPTION OF THE INVENTION

The term "vermiculite" used herein refers to all materials known mineralogically or commercially as vermiculite, and minerals consisting wholly or largely of vermiculite including minerals of a mixed-layer type (phyllosilicates) containing vermiculite layers as a constituent such as hydrobiotites and chlorite-vermiculites, and which can be delaminated in the same or similar manner as vermiculite.

Generally, aqueous slurries of vermiculite ore particles which are delaminated by shearing in accordance with this invention can comprise from about 10% to about 50% by weight solids, the preferred range being from about 10% to about 35% by weight, and most preferably from about 20% to about 35% by weight. The weight percent solids content of said slurries is limited by such factors as the slurry viscosity, the means of shearing action employed, and the viscosity and corresponding final flowability of the resulting dispersion of vermiculite lamellae.

The vermiculite ore particles are delaminated by subjecting the aqueous-ore slurry to a shearing force such as a rotary paddle, cowles blade or by means of some other shearing device known in the art. A colloid mill or some similar type of shearing macerator may also be employed in accordance with the instant invention, including a Waring blender or a macerator of the type similar to those used for domestic purposes; or a small media or ball type mill. A shearing force may also be imparted by suitable vibratory treatment, for example, ultrasonic agitation of the aqueous-ore slurry.

The object of the delamination step is to produce a dispersion of vermiculite lamellae or platelets having particle size typically less than 200 microns, preferably less than 50 microns, and having one dimension much smaller than the other two with an aspect ratio of at least 10, preferably at least 100, and more preferably at least 1,000, for example 10,000. Thus, shearing can be applied for the minimum time necessary to achieve a dispersion containing particles of the aforesaid preferred dimensions.

Delamination of the vermiculite ore particles, in accordance with the invention, may be carried out at any reasonable processing temperature, for example, 25° C. processing temperatures may range, however, from 0° C. to refluxing temperatures.

In accordance with a further aspect of this invention, a dispersant or combination of dispersants can be added to the aqueous slurry of vermiculite before, during or after shearing, or a combination thereof, to allow for processing higher solids content slurries by decreasing the viscosity of such slurries without exfoliating or swelling the vermiculite granules and therein increasing the volume.

In a broad aspect, high charge density anionic or cationic compounds or highly functionalized non-ionic compounds are suitable dispersants in this invention.

Examples of inorganic compounds useful as dispersants include the alkali metal salts of polyphosphates, for example, tetrasodium pyrophosphate or sodium hexametaphosphate, soluble silicate and silicic acid derivatives such as sodium silicate, and alkali metal hydroxides such as sodium hydroxide.

Examples of organic compounds useful as dispersants in accordance with this invention include derivatives of alkyl, aryl or alkylarylamines such as propylamine, derivatives of polyamines such as polyethylenimines, polyvinlypyrrolidones, poly(N-vinyl-2-oxazolidinones), polyvinyltrimethylammonium chlorides, polyallylamine chlorides, polyvinylbenzyltrimethylammonium chlorides, poly(N-vinyl-2,3-dimethylimidazolinium chlorides), poly(diallylammonium chlorides) such as poly(N-methyl-diallylamine hydrochloride-epichlorohydrin) available as Kymene$^R$ 2064 from Hercules Incorporated, and poly(N,N-dimethyl-3,5-methylene piperidinium chlorides). Also useful are polyamide derivatives such as polyacrylamide and copolymers of polyamide with acrylic acid or methacrylic acid, amine containing polyamides, polyalcohols such as polyvinylalcohols, free acids or alkali metal salts of poly organo acids such as polyacrylic acid or polymethacrylic acid, sulfonated alkyl, aryl or alkylaryl organic acids such as polyvinylsulfonic acid and sulfonated oils such as the Twitchell line of products sold by Emery Chemicals. Further useful compounds as dispersants in accordance with this invention include water soluble or miscible free acids or salts of phosphoric acid and organo phosphoric acid derivatives, such as mono, di, or triesters of phosphoric acid containing polyether groups capped with alkyl-aryl or alkyl groups which are commercially available as the GAFAC line of products sold by the GAF Corporation.

In accordance with this invention, preferred dispersants include polyamine-epichlorohydrin derivatives such as poly(N-methyl-diallylamine hydrochloride-epichlorohydrin) available as Kymene$^R$ 2064 from Hercules Incorporated, alkali metal hydroxides, sodium silicate, sodium hexametaphosphate, tetrasodium pyrophosphate, polyvinylpyrrolidones, sulfonated mineral oils such as Twitchell 8262 and 8266 available from Emery Chemicals, water soluble free acids or salts of phosphoric acid such as GAFAC PE 510 and RE 610 available from GAF Corporation, polyethylenimines, polyallylamine hydrochlorides, and primary and secondary amines wherein the alkyl groups have from about 2 to about 6 carbon atoms.

In accordance with this invention, such dispersants are typically added to aqueous vermiculite ore slurries or resultant dispersions of vermiculite lamellae as a dilute aqueous dispersion or suspension. Said dispersants can comprise from about 0.1 percent to about 10 percent by weight of the total solids content of the vermiculite ore slurry or resultant dispersion, with about 0.5 percent to about 5.0 percent by weight being the preferred range.

The amount of dispersant necessary to control the viscosity of the vermiculite ore-water slurry or the resultant dispersion of vermiculite lamellae after shearing said slurry can depend on such process variables as temperature, slurry or dispersion pH, extent of conversion of slurried vermiculite ore to vermiculite lamellae, the shearing device employed, any chemical or thermal treatments performed on the vermiculite ore, and of course, the solids level of the vermiculite ore-water slurry and/or resultant dispersion.

As mentioned above, aqueous slurries of vermiculite ore particles which are delaminated by shearing in accordance with the invention and/or the resultant dispersions of vermiculite lamellae to which are added the aforementioned dispersants comprise from about 10% percent to about 80% percent by weight total solids, the preferred range being from about 20% percent to about 70% percent by weight total solids, and most preferably from about 30% percent to about 55% percent by weight total solids.

It is an aspect of this invention that the method of addition of the dispersant to the aqueous ore slurry or to the resultant dispersion of vermiculite lamellae is not critical. For example, the dispersant and the water for the slurry can be mixed before the subsequent addition of the ore thereto with stirring. More preferable is the addition of the dispersant to an aqueous ore slurry which has already been prepared. As mentioned above, such addition of dispersant can be added to an aqueous-ore slurry before or during mechanical shearing of the slurry, or any combination thereof, or to the resultant dispersion of vermiculite lamellae.

Dispersions of vermiculite lamellae, in accordance with this invention, can further be used to manufacture any article comprising vermiculite as disclosed by the prior art, for example, to manufacture such articles as film, coatings, and non-sheet solids composed of in part or substantially wholly vermiculite lamellae by any method known in the art. Other materials may be added to dispersions of vermiculite lamellae in accordance with this invention depending on the particular properties and end uses contemplated of articles manufactured therefrom. Such materials include, for example, inorganic fillers such as silica, silica glass, clay, aluminum hydroxide, talc and the like. Further, materials such as continuous (filamentary), discontinuous (chopped or staple), or agglomerates of carbon (graphite), glass, boron, silica or ceramic type fibers can also be incorporated with dispersions of vermiculite lamellae in accordance with this invention to manufacture solid articles therefrom comprising fibrous vermiculite composite structures. As herein mentioned, methods for the manufacture of such vermiculite-containing articles are well known in the art. Such films and coatings may be used, for example, as refractory-facing materials, fireproof packaging materials, thermal insulation materials, materials for gasket fabrication, and electrical insulating materials.

The following examples more fully illustrate preferred embodiments for the production of dispersions of vermiculite lamellae in accordance with one aspect of this invention, and solid articles manufactured from said dispersions in accordance with another aspect of this invention. It is, however, to be understood that this invention is not in any way limited thereto.

EXAMPLES I-II

These examples illustrate one aspect of this invention wherein a dispersant is added to an aqueous slurry of vermiculite ore therein allowing for the processing of higher solids content aqueous-ore slurries into dispersions of vermiculite lamellae.

In Example I a slurry consisting of 175 grams of vermiculite grade 4 ore (ASTM material designation C-516) and 175 grams distilled water is sheared in a Waring blender for one hour. Distilled water is added as needed during shearing to maintain slurry flow resulting after one hour in a flowable dispersion of vermiculite lamellae containing about 33% by weight solids. The percent of vermiculite ore particles reduced to less than 38 microns in dimension (#400 mesh screen) is then determined.

In Example II, Example I is repeated except that Kymene ® 2064 in an amount equal to 4% by weight of vermiculite ore is added to the aqueous-ore slurry just prior to shearing resulting after one hour in a flowable weight solids. The percent of vermiculite ore particles reduced to less than 38 microns as set forth in Example I is then determined. The results of Examples I and II are summarized below in Table 1.

TABLE I

| Example No. | wt. % Conversion to less than 38 microns | wt. % solids* |
|---|---|---|
| I | 71 | 33 |
| II | 72 | 52 |

*flowable dispersion

EXAMPLES III-XII

These examples further illustrate an aspect of the invention wherein preferred dispersants are added to an aqueous slurry of vermiculite ore therein allowing for the processing of higher solids content aqueous-ore slurries into dispersions of vermiculite lamellae.

In Examples III-XII, Example I is repeated except that various preferred dispersants are added incrementally during ore shearing to maintain dispersion flow in the amounts indicated as summarized in Table 2 below. Weight percent conversions of vermiculite ore particles to dimensions of less than 38 microns and corresponding final flowable dispersion solids weight percent at the end of one hour of shearing for each dispersant represented is also summarized in the table.

TABLE 2

| Example No. | Dispersant | Total Weight % Dispersant | Wt. % Conversion to less than 38 microns | wt. % solids* |
|---|---|---|---|---|
| I | None | — | 71 | 33 |
| II | Kymene ® 2064 | 4.0 | 72 | 52 |
| III | sodium hydroxide | 0.5 | 72 | 48 |
| IV | sodium silicate | 0.5 | 75 | 48 |
| V | tetrasodium pyrophosphate | 0.7 | 71 | 46 |
| VI | Kymene 2064 | 2.5 | 70 | 50 |
| VII | GAFAC PE 510 | 2.0 | 78 | 48 |
| VIII | **polyvinylpyrrolidene | 2.0 | 66 | 43 |
| IX | Twitchell 8262 | 2.2 | 67 | 48 |
| X | Twitchell 8266 | 2.2 | 64 | 48 |
| XI | ***poly(ethylenimine) | 2.3 | 58 | 46 |

*Weight percent solids represents the final flowable dispersion solids weight percent at the end of one hour shear.
**Average molecular weight of 360,000
***Average molecular weight of 50,000-60,000

EXAMPLES XII-XXIV

These examples illustrate another aspect of the invention wherein preferred dispersants are added to dispersions of delaminated vermiculite lamellae to determine dispersant effectiveness as measured by viscosity reduction.

In these examples, various indicated dispersants are added in 0.15 weight percent increments to a 44.5 weight percent dispersion of delaminated grade 4 vermiculite ore using a Cowles blade rotated at 750 rpm to assure uniform mixing. Levels of indicated dispersant needed to reduce the viscosity of the vermiculite dispersion from 750 cps to less than 40 cps are summarized in Table 3 below.

TABLE 3

Addition of Dispersants to Delaminated Vermiculite Ore

| Example No. | Dispersant | Weight Percent[a] Addition |
|---|---|---|
| I | propylamine | 0.6 |
| II | sodium silicate | 0.9 |
| III | tetrasodium pyrophosphate | 0.9 |
| IV | sodium hydroxide | 1.1 |
| V | polyallylamine hydrochloride | 1.1 |
| VI | polyethylenimine* hydrochloride | 1.1 |
| VII | polyethylenimine | 1.5 |
| VIII | Kymene^R 2064 | 1.5 |
| IX | GAFAC PE 510 | 1.7 |
| X | GAFAC RE 610 | 1.8 |
| XI | Twitchell 8262 | 2.1 |
| XII | Kymene^R 450** | 2.1 |
| XIII | polyvinylpyrrolidone*** | 2.1 |

TABLE 3-continued

Addition of Dispersants to Delaminated Vermiculite Ore

| Example No. | Dispersant | Weight Percent[a] Addition |
|---|---|---|
| XIV | Twitchell 8266 | 2.1 |

*Neutralized to pH 6.5 with hydrochloric acid
**Kymene 450 is a polyaminoamide-epichlorohydrin resin available from Hercules Incorporated.
***Average molecular weight of 360,000
[a] to achieve the lowest flowable dispersion viscosity

We claim:

1. A one step process for the production of an aqueous dispersion of vermiculite ore particles comprising mechanically delaminating vermiculite ore by subjecting an aqueous slurry of the ore to a shearing action until a dispersion containing vermiculite lamellae having dimensions less than 200 microns is produced.

2. The process as claimed in claim 1 wherein the aqueous slurry of vermiculite ore comprises a dispersant capable of giving the slurry a viscosity less than the viscosity of the slurry without said dispersant.

3. The process as claimed in claim 2 wherein the aqueous slurry of vermiculite ore comprises from about 10 percent to about 80 percent by weight solids and from about 0.1 percent to about 10.0 percent by weight dispersant based on the weight of ore in the slurry.

4. The process as claimed in claim 2 wherein the aqueous slurry of vermiculite ore comprises from about 20 percent to about 55 percent by weight solids and from about 0.5 percent to about 5.0 percent by weight dispersant based on the weight of ore in the slurry.

5. In a process for the production of solid articles from vermiculite comprising the steps of:
   (a) delaminating vermiculite ore until vermiculite lamellae having dimensions less than 200 microns is produced, then
   (b) forming shaped articles from an aqueous dispersion of the lamellae produced in step (a) by depositing the vermiculite lamellae on a surface and removing the water
wherein the improvement comprises mechanically delaminating the vermiculite ore in one step by subjecting n aqueous slurry of the ore to a shearing action until vermiculite lamellae having dimensions less than 200 microns is produced.

6. The process as claimed in claim 5 wherein the aqueous slurry of vermiculite ore comprises a dispersant capable of giving the slurry a viscosity less than the viscosity of the slurry without said dispersant.

7. The process as claimed in claim 6 wherein the aqueous slurry of vermiculite ore comprises from about 10 percent to about 80 percent by weight solids and from about 0.1 percent to about 10.0 percent by weight dispersant based on the weight of ore in the slurry.

8. The process as claimed in claim 6 wherein the aqueous slurry of vermiculite ore comprises from about 20 percent to about 55 percent by weight solids and from about 0.5 percent to about 5.0% by weight dispersant based on the weight of ore in the slurry.

9. The process as claimed in claim 6 wherein the dispersant is selected from the group consisting of alkali metal salts of polyphosphates, soluble silicate and silicic acid derivatives, alkali metal hydroxides, derivatives of alkyl, aryl or alkylarylamines, derivatives of polyamines and polyamides, amine containing polyamides, polyalcohols, free acids or alkali metal salts of polyorganoacids, sulfonate aklyl, aryl or alkylaryl organo acids, sufonated oil and miscible free acids or salts of phosphoric acid or organo phosphoric acid derivatives.

10. The process as claimed in claim 6 wherein the dispersant is poly(N-methyl-diallyalamine hydrochloride-epichlorohydrin).

11. The process as claimed in claim 6 wherein the dispersant is sodium hexametaphosphate.

12. The process as claimed in claim 6 wherein the dispersant is tetrasodium phosphate.

13. The process as claimed in claim 6 wherein the dispersant is sodium hydroxide.

14. The process as claimed in claim 6 wherein the dispersant is sodium silicate.

15. In a process for the production of solid articles from layer-silicate mineral ore comprising the steps of:
   (a) delaminating the layer-silicate mineral ore until layer-silicate mineral lamellae having dimensions less than 200 microns is produced, than
   (b) forming shaped articles from an aqueous dispersion of the lamellae produced in step (a) by depositing the layer-silicate mineral lamellae on a surface and removing the water from said lamellae,
wherein the improvement comprises mechanically delaminating the layer-silicate mineral ore in one step by subjecting an aqueous slurry of the ore containing from about 10 percent to about 80 percent by weight of ore solids to a shearing action until layer-silicate mineral lamellae having dimensions less than 200 microns is produced.

16. The process as claimed in claim 15 wherein the aqueous slurry of layer-silicate mineral ore contains from about 0.1 percent to about 10.0 percent by weight, based on the weight of the ore in the slurry, of poly(N-methyl-diallylamine hydrochloride-epichlorohydrin) as a dispersant.

* * * * *

UNITED STATES PATENT AND TRADEMARK OFFICE
CERTIFICATE OF CORRECTION

PATENT NO. : 4,801,403
DATED : January 31, 1989
INVENTOR(S) : LU & NELSON

It is certified that error appears in the above-identified patent and that said Letters Patent is hereby corrected as shown below:

Column 7, Line 44, Claim 5

"n" should read --an--

Column 8, Line 17, Claim 9

"sufonated" should read --sulfonated--

Column 8, Line 20, Claim 10

"diallyalamine" should read --diallylamine--

Column 8, Line 34, Claim 15

"than" should be --then--

Signed and Sealed this

Twenty-seventh Day of June, 1989

Attest:

DONALD J. QUIGG

Attesting Officer     Commissioner of Patents and Trademarks